July 9, 1963  P. LÜSCHER  3,097,266
TELEPHONE FEE COUNTER
Filed May 20, 1959
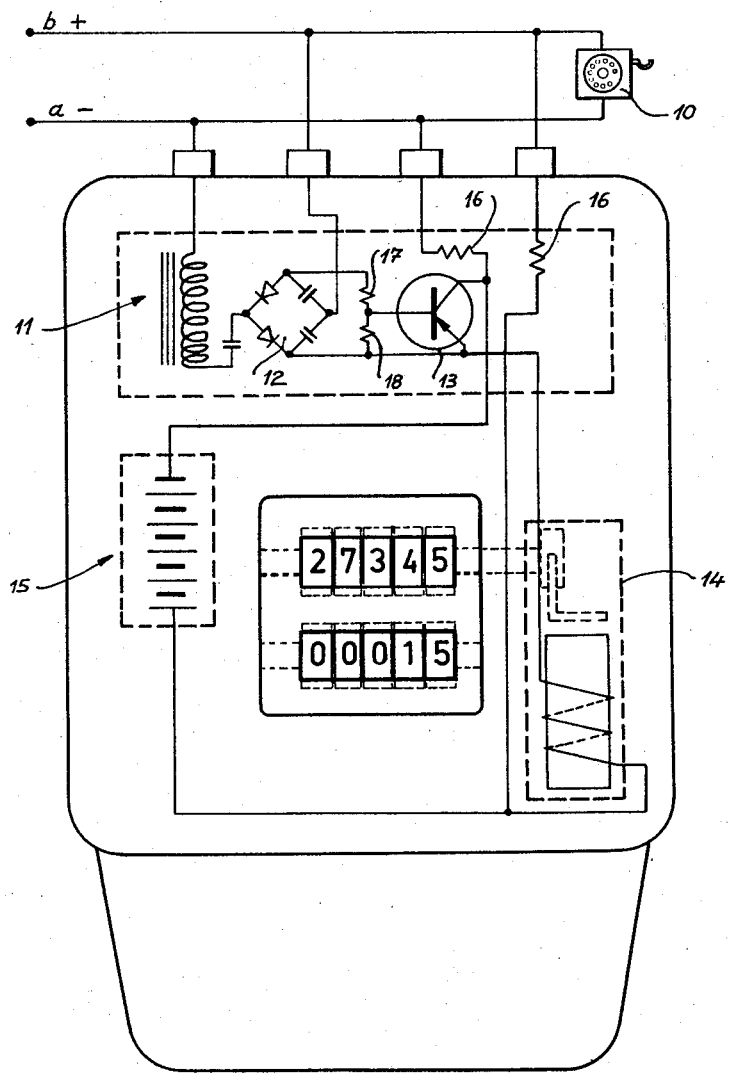
Inventor:
Paul LÜSCHER
by: J. Delatin-Seguy
Attorney United States Patent Office 3,097,266
Patented July 9, 1963

3,097,266
TELEPHONE FEE COUNTER
Paul Lüscher, Geneva, Switzerland, assignor to Sodeco, Societe des Compteurs de Geneve, Geneva, Switzerland, a firm of Switzerland
Filed May 20, 1959, Ser. No. 814,441
Claims priority, application Switzerland May 23, 1958
4 Claims. (Cl. 179—7)

Telephone fee counters or subscriber's meters are known which record fee pulses without resorting to any external supply of energy and which are operated solely by the actual energy of the fee pulses. Arrangements of this type show the drawback of requiring the production of pulses of a comparatively high power capable of detrimentally acting on certain elements of the telephonic system; in particular, they may lead to the production through interference of parasitic noises in adjacent circuits. If it is attempted to remove these drawbacks, it is necessary to weaken the energy of the fee pulses produced to an extent such that the energy of a fee pulse is no longer sufficient for the direct actuation of the pulse counter. Under such conditions, it is necessary to amplify the fee pulses and, in order to operate the amplifier, an auxiliary supply of energy is required. Transistors are advantageously used for such amplifying purposes and arrangements of this type are generally known.

Similarly, it has already been proposed to feed such a fee amplifier by means of a battery, housed in the exchange, through the agency of the subscriber's line. A known arrangement resorts for this purpose to a resistance inserted in series with the subscriber's line, while the drop in voltage obtained serves for actuating the amplifier. The drawback of this arrangement resides in the fact that the resistance inserted in series leads to a further undesired weakening of the telephonic current. Furthermore, fee pulses can be transmitted only during the actual call and those fee pulses which are transmitted after the end of the conversation are no longer recorded.

Another known arrangement resorts to a condenser as a supply of energy. This arrangement leads also to considerable drawbacks, since it requires in particular the execution of a large-sized condenser adapted to produce a sufficient energy. If an electrolytic condenser is used for this purpose, the reliability of operation is limited.

The arrangement according to the present invention removes the above-mentioned drawbacks. It resorts to a small storage battery as a supply of energy for actuation of the fee indicator. In the absence of any call, the storage battery of the fee counter or indicator is charged by the battery at the exchange through the agency of the subscriber's line. The discharge of the storage battery through the winding controlling the fee indicator is governed by the operation of a transistor controlled by the fee pulses.

In the accompanying drawing, the single FIGURE illustrates diagrammatically, by way of a mere exemplification, a preferred embodiment of the invention.

The arrangement illustrated includes in shunt relationship with reference to the line *a—b—* connecting the subscriber's station 10 with the exchange, a filter 11, a rectifier bridge 12, a transistor 13, a winding 14 actuating the fee indicator, a small battery 15 and two loading resistances 16. The base of the transistor 13 is connected with the connecting point between the two resistances 17 and 18 connected respectively with the ends of the diagonal of the bridge 12.

As long as no communication is established, the battery 15 is charged through the agency of the subscriber's line *ab* and of the resistances 16 by the battery at the exchange. Said resistances 16 are given sizes such that they lead to only a negligible weakening of the conversation.

Furthermore, the charging current is maintained at a sufficiently low intensity so that no other element such as relays for instance may be unfavourably influenced. In particular, the arrangement disclosed provides for the reliable dropping of all the relay contacts at the end of a telephone call.

It is possible to resort advantageously to batteries constituted by one or more fluidtight cells which require no upkeep and the life of which is long, such, in particular, as cadmium-nickel cells. The battery is housed in the same casing as the fee counter.

The recording of the fee pulses through the arrangement described and illustrated is performed as follows:

A fee pulse at an arbitrary frequency of say 50 cycles or 16 kilocycles entering the circuit *ab* through the filter 11 and is rectified by the bridge 12. The voltage divider constituted by the resistances 17 and 18 inserted in parallel produces a negative bias for the base of the transistor 13. The latter is thus conductive and a current supplied by the battery 15 flows through the circuit constituted by the winding 14 and the collector and the transmitter of the transistor.

The fee counter records the number of pulses. As soon as the pulse has stopped, the biasing of the base of the transistor 13 is removed. The transistor is again locked and no current flows any longer through the winding 14. The fee pulses coming in after the end of a call are recorded in the same manner as those which are produced during said call.

What I claim is:

1. In a telephone fee counter system for a subscriber's station comprising a subscriber's telephone set, two electric telephone wires connected at one end with a telephone exchange and at the other end to said set and feeding the latter, a fee counter with fee pulses generated from the exchange over said wires, in combination with said set and said wires and with the fee counter, a winding controlling the fee counter, a battery, an ungrounded auxiliary circuit including two terminal sections connected respectively with the corresponding telephone wire and two main sections interconnecting in parallel the terminal sections and passing respectively through the winding and through the battery, equal resistances inserted in each terminal section of the auxiliary circuit, a transistor having a time-base circuit and having its emitter and collector inserted in the main section of the auxiliary circuit passing through the winding and normally preventing the passage of current into the latter, a shunt circuit inserted across the telephone wires, a rectifying bridge inserted in said shunt circuit, filtering means inserted in the shunt circuit to limit the quantity of current passing through said shunt circuit to the fee pulses, said fee pulses being transmitted over said wires into said shunt circuit, and means feeding the fee pulses from the shunt circuit to the time-base circuit of said transistor to release the transistor and to ensure thus a discharge of the battery through the auxiliary circuit into the counter-controlling winding, said fee counter system, including said fee counter, said battery, said transistor, said bridge, said filtering means, said resistances and the connections between said wires and said set being all located at the subscriber's station.

2. In a telephone fee counter system for a subscriber's station comprising a subscriber's telephone set, two electric telephone wires connected at one end with a telephone exchange and at the other end to said set and feeding the latter, a fee counter with fee pulses generated from the exchange over said wires in combination with said set and said wires and with the fee counter, a winding controlling the fee counter, a battery of a type requiring no upkeep, an ungrounded auxiliary circuit including two terminal sections connected respectively with the corresponding telephone wire and two main sections interconnecting in parallel the terminal sections and passing respectively through the winding and through the battery, equal resistances inserted in each terminal section of the auxiliary circuit, a transistor having a time-base circuit and having its emitter and collector inserted in the main section of the auxiliary circuit passing through the winding and normally preventing the passage of current into the latter, a shunt circuit inserted across the telephone wires, a rectifying bridge inserted in said shunt circuit, filtering means inserted in the shunt circuit to limit the quantity of current passing through said shunt circuit to the fee pulses, said fee pulses being transmitted over said wires into said shunt circuit, and means feeding the fee pulses from the shunt circuit to the time-base circuit of said transistor to release the transistor and to ensure thus a discharge of the battery through the auxiliary circuit into the counter-controlling winding, said fee counter system, including said fee counter, said battery, said transistor, said bridge, said filtering means, said resistances and the connections between said wires and said set being all located at the subscriber's station.

3. In a telephone fee counter system for a subscriber's station comprising a subscriber's telephone set, two electric telephone wires connected at one end with a telephone exchange and at the other end to said set and feeding the latter, a fee counter with fee pulses generated from the exchange over said wires in combination with said set and said wires and with the fee counter, a winding controlling the fee counter, a battery, an ungrounded auxiliary circuit including two terminal sections connected respectively with the corresponding telephone wire and two main sections interconnecting in parallel the terminal sections and passing respectively through the winding and through the battery, equal resistances carried in each terminal section of the auxiliary circuit, a transistor having a time-base circuit and having its emitter and collector inserted in the main section of the auxiliary circuit passing through the winding and normally preventing the passage of current into the latter, a shunt circuit inserted across the telephone wires, a rectifying bridge inserted in said shunt circuit, filtering means inserted in the shunt circuit to limit the quantity of current passing through said shunt circuit to the fee pulses, said fee pulses being transmitted over said wires into said shunt circuit, means feeding the fee pulses from the shunt circuit to the time-base circuit of said transistor to release the transistor and to ensure thus a discharge of the battery through the auxiliary circuit into the counter-controlling winding, and a casing enclosing the fee counter and the battery, said fee counter system, including said fee counter, said battery, said transistor, said bridge, said filtering means, said resistances and the connections between said wires and said set being all located at the subscriber's station.

4. In a telephone fee counter system for a subscriber's station comprising a subscriber's telephone set, two electric telephone wires connected at one end with a telephone exchange and at the other end to said set and feeding the latter, a fee counter with fee pulses generated from the exchange over said wires in combination with said set and said wires and with the fee counter, a winding controlling the fee counter, a battery, an ungrounded auxiliary circuit including two terminal sections connected respectively with the corresponding telephone wire and two main sections interconnecting in parallel the terminal sections and passing respectively through the winding and through the battery, equal resistances inserted in each terminal section of the auxiliary circuit, a transistor having a time-base circuit and having its emitter and collector inserted in the main section of the auxiliary circuit passing through the winding and normally preventing the passage of current into the latter, a shunt circuit inserted across the telephone wires, filtering means inserted in the shunt circuit to limit the quantity of current passing through said shunt circuit to the fee pulses, said fee pulses being transmitted over said wires into said shunt circuit, a rectifying bridge inserted in the shunt circuit and a potential divider through which the output end of the rectifying bridge feeds the base circuit of the transistor upon application of a fee pulse to the bridge to bias the transistor and thereby release the transistor and to ensure thus a discharge of the battery through the auxiliary circuit into the counter-controlling winding, said fee counter system, including said fee counter, said battery, said transistor, said bridge, said filtering means, said resistances and the connections between said wires and said set being all located at the subscriber's station.

References Cited in the file of this patent

FOREIGN PATENTS

| | | |
|---|---|---|
| 403,508 | Great Britain | Dec. 28, 1933 |
| St. 8,962 VIIIa/21a³ | Germany | May 22, 1956 |
| 969,178 | Germany | May 8, 1958 |